May 30, 1939.  K. P. BRACE  2,160,055
BRAKE
Filed June 5, 1937
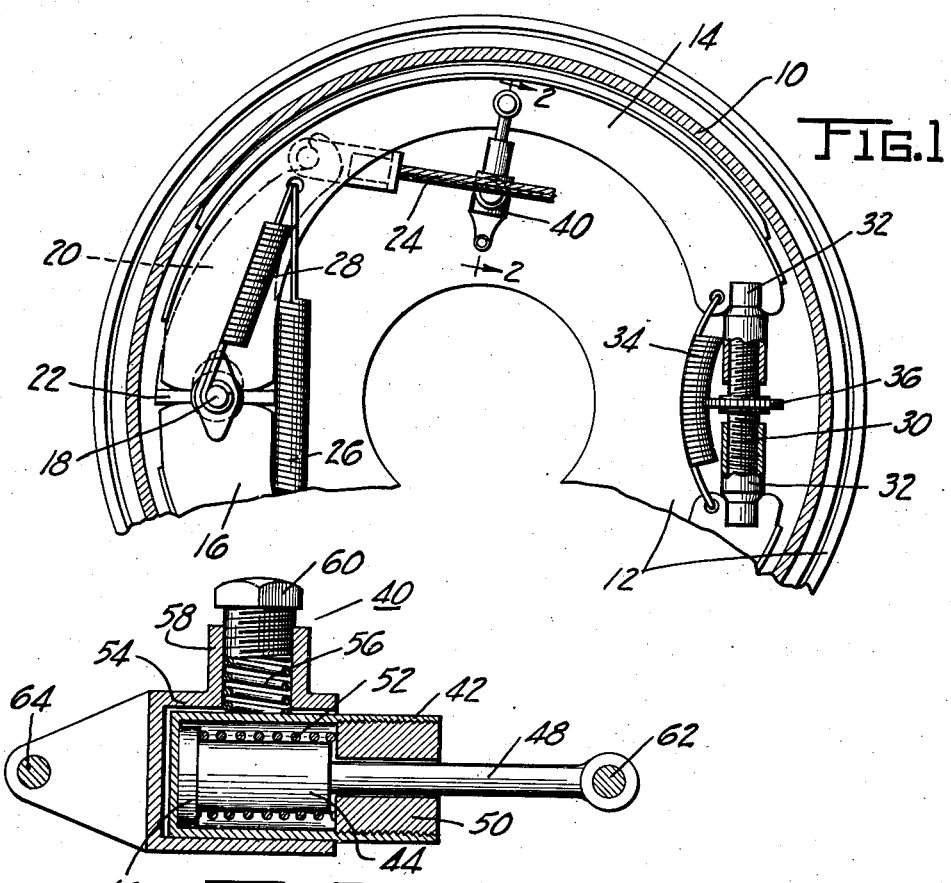
Fig.1
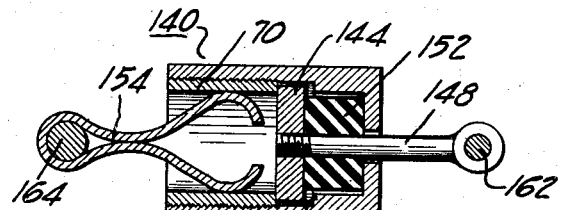
Fig.2
Fig.3
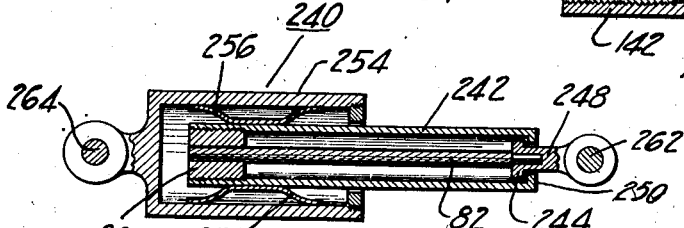
Fig.4
INVENTOR
KEMPER P. BRACE
BY
ATTORNEY Patented May 30, 1939

2,160,055

UNITED STATES PATENT OFFICE 2,160,055

BRAKE

Kemper P. Brace, South Bend, Ind., assignor to Bendix Products Corporation, South Bend, Ind., a corporation of Indiana Application June 5, 1937, Serial No. 146,583

5 Claims. (Cl. 188—79.5)

This invention relates to brakes, and is illustrated as embodied in an internal expanding brake for an automobile wheel.

An object of the invention is to provide a device for automatically adjusting the brake for wear, as for example by automatically determining the clearance of the brake shoe when the brake is released. A particular object is to provide a device of this character in which the working parts are all housed within a cylinder or the equivalent.

The above and other objects of the invention and various novel features of construction and arrangement, will be apparent from the following description of the illustrative embodiment shown in the accompanying drawing, in which:

Figure 1 is a partial section through the brake, just inside the head of the brake drum, and showing the brake shoes in side elevation;

Figure 2 is a section through the novel automatic adjustment device, on the line 2—2 of Figure 1; and Figures 3 and 4 are sections through alternative forms of adjustment devices.

While the devices embodying my invention can be used equally well with standard anchored-shoe brakes, and other types of brakes, the brake shown in Figure 1 is of the shiftable anchorage type. It includes a rotatable drum 10, at the open side of which is a support such as a backing plate 12, and within which are the brake shoes 14 and 16.

The shoes have between the notched ends of their webs, at one side of the brake, an anchor post 18 carried by the backing plate, adjacent which is an applying device such as a floating lever 20 having lugs 22 projecting between ends of the shoe webs. The lever 20 may be actuated by a suitable Bowden type cable-and-conduit control, the cable 24 of which extends through the backing plate and is connected to the lever 20.

The lever 20 acts to apply the brake against the resistance of a return spring 26 tensioned between the shoes. Preferably an unbalancing spring 28 is tensioned between the anchor 18 and the secondary shoe (i. e. the shoe which is anchored in forward braking).

The ends of the shoes opposite the anchor 18 are shown adjustably connected by means such as a right-and-left threaded floating member 30 threaded into sockets 32 engaging the ends of the shoe webs, and against which the shoes are held by a spring 34 tensioned between them and also serving yieldingly to lock the member 30 by engaging a serrated central peripheral rib 3 thereon. The rib 36 is accessible through a suitable opening in the backing plate, for engagement with a tool to turn the member 30 to make the desired adjustment.

The present invention relates to an automatically adjustable device 40 (Figures 1 and 2), or 140 (Figure 3), or 240 (Figure 4), adapted to be connected at one end to the brake shoe or its equivalent and at the other end to a stationary part such as the backing plate 12.

The automatically adjustable device 40 includes a cylinder 42, within which is a plunger 44 having a flange or head 46 at one end and having at its other end a stem 48 sliding through a bearing sleeve 50, adjustably threaded into the end of the cylinder 42 to serve also as an abutment engaged by the base of the plunger 44 after a lost motion corresponding to the desired maximum shoe clearance. A spring 52 is compressed between the abutment 50 and the flange 46.

The cylinder 42 projects into the open end of a larger cylinder 54, and its exterior surface is held yieldingly frictionally gripped to the internal surface of the outer cylinder 54 by means such as a spring 56. The spring 56 is shown arranged in a hollow boss 58 in the side wall of the cylinder 54, backed up by a threaded plug 60, and acts to force the cylinder 42 crosswise of the cylinder 54.

The plunger stem 48 is connected, by means such as a pivot pin 62, either to the shoe or to the backing plate, while the head of the outer cylinder 54 is connected, by means such as another pivot pin 64, to the backing plate or the shoe.

In operation, the normal application of the brake merely takes up the clearance between the abutment 50 and the base of the plunger 44. When the brake wears so that the shoe moves further than this when applied, the plunger 44 seats solidly against the abutment 50, and the excess shoe movement shifts the cylinder 42 axially within the cylinder 54. When the brake is released the head 46 seats against the closed end of the cylinder 42.

In Figure 3, parts corresponding to parts in Figure 2 are designated by the same reference characters increased by 100. In this embodiment, a looped spring 154 projects into the open end of the cylinder 142 and frictionally expansibly grips a friction sleeve 70 threaded thereinto.

The plunger 144 engages, after its lost motion, a shoulder 150 on the cylinder 142; and the spring 52 is replaced by a block 152 of rubber. When the brake is released, the plunger 144 seats against the end of the sleeve 70. In this case it is the sleeve 70, rather than abutment 50 as in Figure 2, which is adjusted to change the clearance of the shoe.

In Figure 4, parts corresponding to parts in Figure 2 are indicated by the same reference characters increased by 200. In this case, plunger 244 after its lost motion seats against the end 250 of the cylinder 242.

The plunger 244 is formed with an axial socket slidably seated on the reduced end of a stop member 82 carried by a plug 80 adjustably threaded into the end of the cylinder 242. The exterior surface of the plunger 242 is frictionally gripped between leaf springs 256 each welded or otherwise secured at one end to the interior surface of the outer cylinder 254. When the brake is released, the plunger 244 seats against the end of the large-diameter portion of the stop 82.

In all three embodiments, after the desired shoe clearance is taken up, excess shoe movement serves to increase the effective length of the automatic adjustment device, so that when the brake is again released the shoe clearance will be back to normal. In all three embodiments the normal shoe clearance can be varied by adjusting abutment 50, or sleeve 70, or plug 80.

While several illustrative embodiments have been described in detail, it is not my intention to limit the scope of the invention to those particular embodiments, or otherwise than by the terms of the appended claims.

I claim:

1. An automatically adjustable device constructed and arranged to be acted on by a brake shoe or the like and comprising a cylinder having arranged therein a plunger having a predetermined free lost motion relatively to the cylinder corresponding to the desired maximum applying movement of said shoe and having connecting means, and connecting means frictionally gripping the surface of said cylinder, one of said connecting means being adapted to be connected to a brake shoe and the other being adapted to be connected to a backing plate.

2. An automatically adjustable device constructed and arranged to be acted on by a brake shoe or the like and comprising a cylinder having arranged therein a plunger having a lost motion relatively to the cylinder corresponding to the desired maximum applying movement of said shoe and having means for connecting it to the shoe or the backing plate, and a larger cylinder into which the first cylinder extends and which is adapted to be connected to the backing plate or the shoe and which has means frictionally gripping the exterior surface of said first cylinder.

3. An automatically adjustable device constructed and arranged to be acted on by a brake shoe or the like and comprising a cylinder having arranged therein a plunger having a lost motion relatively to the cylinder corresponding to the desired maximum applying movement of said shoe and having means for connecting it to the shoe or the backing plate, and a larger cylinder into which the first cylinder extends and which is adapted to be connected to the backing plate or the shoe and which is provided with means yieldingly urging its interior surface into frictional engagement with the exterior surface of the first cylinder.

4. An automatically adjustable device constructed and arranged to be acted on by a brake shoe or the like and comprising a cylinder having arranged therein a plunger having a lost motion relatively to the cylinder corresponding to the desired maximum applying movement of said shoe and having means for connecting it to the shoe or the backing plate, and a larger cylinder into which the first cylinder extends and which is adapted to be connected to the backing plate or the shoe and which is provided with leaf springs yieldingly gripping the exterior surface of the first cylinder.

5. An automatically adjustable device constructed and arranged to be acted on by a brake shoe or the like and comprising a cylinder having arranged therein a plunger having a lost motion relatively to the cylinder corresponding to the desired maximum applying movement of said shoe and having means for connecting it to the shoe or the backing plate, and a looped spring member extending into the other end of the cylinder and frictionally expansibly gripping the interior surface of said cylinder and which is adapted to be connected to the backing plate or the shoe.

KEMPER P. BRACE.